Dec. 8, 1942.                E. B. STURGES                 2,304,666
               METHOD OF MAKING UNIVERSAL JOINT YOKES
                    Filed Jan. 26, 1940        2 Sheets-Sheet 1
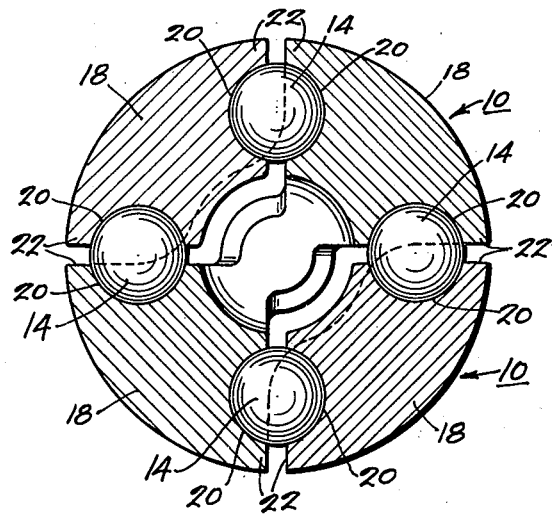
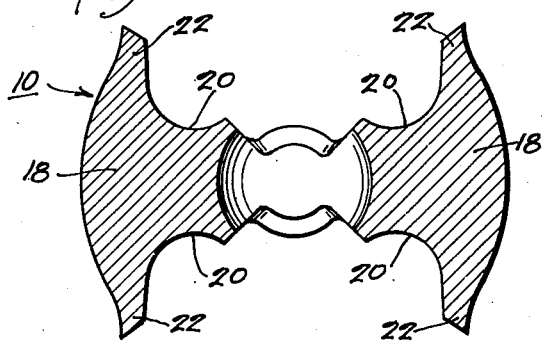
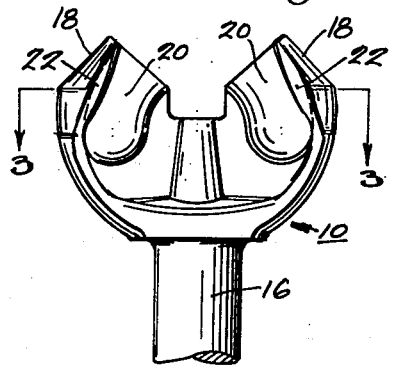
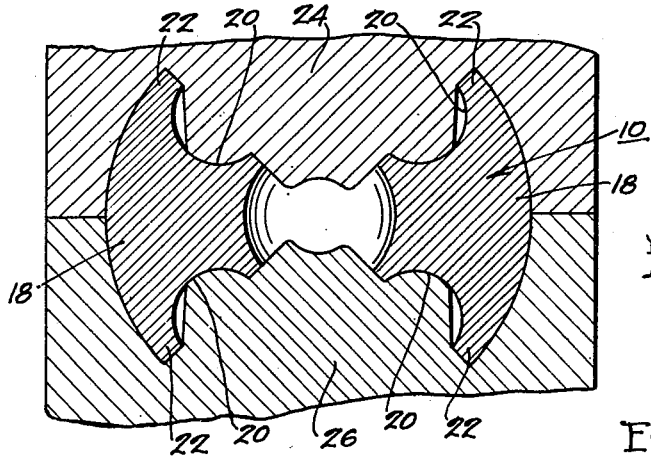
INVENTOR.
EDWARD B. STURGES.
BY A. R. McCrady
ATTORNEY.

Dec. 8, 1942.   E. B. STURGES   2,304,666
METHOD OF MAKING UNIVERSAL JOINT YOKES
Filed Jan. 26, 1940   2 Sheets-Sheet 2
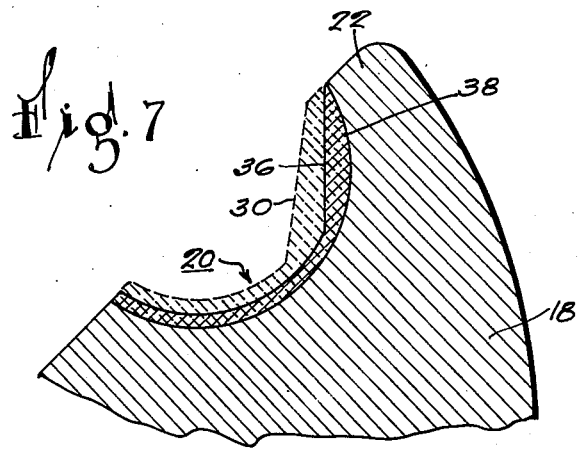
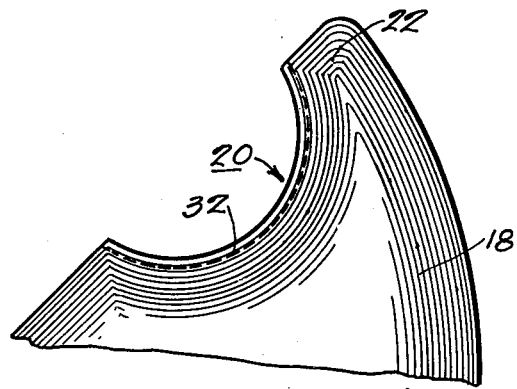
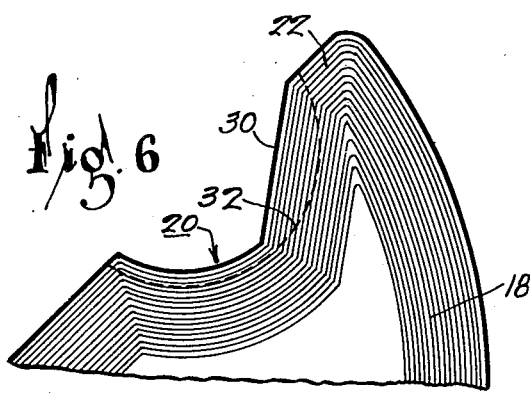
INVENTOR.
EDWARD B. STURGES
BY A. R. McCrady
ATTORNEY.

Patented Dec. 8, 1942

2,304,666

UNITED STATES PATENT OFFICE 2,304,666

METHOD OF MAKING UNIVERSAL JOINT YOKES

Edward B. Sturges, South Bend, Ind., assignor to Bendix Aviation Corporation, South Bend, Ind., a corporation of Delaware Application January 26, 1940, Serial No. 315,676

9 Claims. (Cl. 29—148)

This invention relates to universal joint yokes of the ball and race type and to methods of forming such yokes.

In universal joints of the ball and race type, such as disclosed for example in Weiss Patent No. 1,522,351, torque is transmitted between two shafts rotating on intersecting axes, through balls carried in raceways of interfitting yokes attached to their respective shafts. The raceways on the arms of a yoke may be parallel to the axis of the shaft, or they may converge either in a straight or a curved line toward one end of the yoke. It is to the races of the converging type that the invention is particularly applicable, although it is also applicable to yokes employing the non-converging races. The invention is herein described as applied to the two-arm type of yoke.

The usual process of manufacturing two-arm yokes consists of rough forging the yoke, annealing, rough machining the races, finish machining the races, carburizing and heat treating. Yokes usually are not forged by an end or axial forge stroke, and to reduce the excess metal, must be formed by axially transverse strokes. This transverse stroke forging results in a forging wherein much rough machining still must be done because of the overhang of the finished raceway in the path of a forging die.

The forging of the races is accomplished by leaving the undercut portion solid, with sufficient draft to remove the forming die. Of necessity, the metal of the yokes must be very tough and resilient in order to transmit power with minimum weight. Thus heavy cuts in tough metal, on a race cutting machine specially designed for the particular job, are necessary, involving a considerable capital expenditure.

In yokes as heretofore constructed, early failure of the races along their edges has sometimes occurred, perhaps due in a large measure to unwarranted fatigue of the metal. This condition largely results from the rough cutting operation, wherein the fibres of metal are cut in forming the raceway. This cutting opens the surface of the fibres allowing fatigue to gain an early start. Also, in the manufacture of the yokes, much trouble is caused by unpredictable distortion of the races upon cooling after carburizing and heat treating. Such distortion is caused by cutting across the fibres of the metal in the rough cut operation. This distortion sometimes requires grinding of the races, an operation not ordinarily performed, and no production equipment being available for such grinding, expensive hand labor must be used. Further, the rough cutting is likely to produce strains in the metal, and since there is no annealing operation before the finish operation, these strains are likely to produce, upon heat treating, distortions unpredictable in amount and extent in the finished article.

In yokes having straight converging races, a complicated mandrel might be employed to shape the races, the mandrel being withdrawn from the diverging end of the races. This, however, is disadvantageous because the yoke arm at the end of the race must be cut away, weakening the arm, and interfering with the operation.

One object of the invention is to provide a universal joint yoke in which the metal structure or fibre is improved, resulting in greater resistance to fatigue and less distortion upon heating and cooling.

Another object of the invention is to form a universal joint yoke by a method which eliminates rough machining, saves on equipment, time and labor, results in more uniform cooling distortion of the races, and which produces better races.

Other objects and advantages of the invention appear in the following description and claims, which may best be understood when read in connection with the accompanying drawings, in which:

Figure 1 is a transverse section of an assembled universal joint of the type in which the invention may be embodied;

Figure 2 is an elevation of a universal joint yoke;

Figure 3 is a transverse sectional view of a partially finished yoke forging formed according to the invention and corresponding to a section taken along the line 3—3 of the finished yoke of Figure 2;

Figure 4 is a similar view of the yoke being held in the secondary forming dies;

Figure 5 is a diagram of the metal flow in a yoke made according to the invention;

Figure 6 is a diagram of the metal flow of a yoke made according to the prior art; and Figure 7 is a diagram of the quantities of metals in a yoke made according to a modified form of the invention.

A universal joint of the type described with reference to Figures 1 and 2, comprises yokes 10 spaced transversely by balls 14, through which power is transmitted.

The yokes have a shank 16, arms 18, and raceways or bearings 20 on either side of each arm.

Where the raceways 20 cut into the arm, a shoulder 22 is formed, which holds the ball in place, and takes a large part of the load transmitted through the universal joint. As shown in Figure 5, the shoulder 22 forms an overhang in a vertical direction, thus preventing the formation of the race by a vertical forging stroke.

In comparison with the old art, the present invention does away wth the necessity of a rough cut operation, by forming the surfaces of the raceways in an open or draw position in the first forging operation as shown in Figure 3. In a separate forming operation the shoulder 22 of the yoke 10 is formed into position by a die 24. This second operation may be done immediately after the primary forging operation so as to use the heat of the metal to facilitate the forming. Since it is difficult to back up the raceway by a suitable forming shape, a backing die is dispensed with and the desired shape obtained merely by forming the metal by a force applied to the outer surface of the shoulder 22 of the yoke. Elimination of the rough cutting releases from duty an expensive race cutting machine, and in the case where the same machine is now used for a rough and finish cut, the output of the machine will be doubled. In addition, the product is improved due to better metal flow.

The secondary forming operation is indicated in Figure 4, wherein the yoke 10 and its arms 18 are held in a holding die 26, which preferably covers as much of the arms as reasonable clearance for withdrawal allows. This holding die 26 should be a coining die, to more accurately form the parts held and reduce the amount of metal to be removed. Forming die 24 closes the portions 22 of the yoke arms to form the raceways 20 in the desired shape. Forming die 24 is also preferably a coining die to reduce the amount of metal to be removed.

The improvement in fibre structure is shown by Figure 5 when compared with Figure 6. The forging according to the prior art is shown in Figure 6, wherein draw face 30 was left on the forging. The necessary rough cut is 32, shown in a dotted line. It is readily apparent that the lines of fibre or metal flow are cut across, at which points fatigue cracks will start. The metal structure in forgings made according to the invention is indicated in Figure 5. The metal fibre lies along the surface of the raceway 22, providing maximum strength, protection from fatigue, and decreased distortion upon heat treating and cooling.

A modification or second embodiment of the invention is shown in Figure 7. The same process is substantially used with substantially the same results, and the modification is sometimes employed because there is less need for attention to careful workmanship.

It has been found in rough forgings that the draft, the inclination of the draw face 30 (shown in Figure 6) from the direction of the forging stroke, can be as small as 5° for uniform results. However, in actual practice, due to wear on the dies, the draft usually is 7° or more in spite of efforts to maintain it at a smaller angle. Thus, in forging yokes under the prior art, there was a 5° to 7° or more of draft in rough forging, the only forging step.

Also, on a rough forging operation there must be considerable material left on the forged yoke, so that the inaccuracies of worn dies and the contraction of the metal upon cooling will not touch the finished surface. This large excess of metal, combined with the large draft at the races, makes necessary a large undercut to form the races. The large amount of metal to be removed makes necessary two machining operations to secure a finished race. First there is a rough cut to hog off the greater portion of the metal, and second, a finish machine cut to secure a smooth surface The large amounts of metal to be removed are clearly shown in Figures 6 and 7.

An advantage of the modification of the invention lies in forging a yoke with so little metal at the undercut of the race that a finish machine cut alone is required, dispensing with the usual rough machine cut. To secure this result, the steps and principles discussed thus far are used.

In rough forging according to a modified form of the invention, the races are formed in an open shape in much the same manner as in Figure 3, except that the shoulder 22 is slightly thicker and displaced farther outwardly. The usual 5° to 7° draft is employed. In a secondary forming step, the metal in the region of the race is backed up by dies, but because the work of forming the yoke is largely done, these dies may be very accurate. The dies employed are coining dies to more accurately form the race surfaces, and to reduce the amount of metal to be removed. The draw face of the dies in the secondary operation, can be as close to vertical as desired, and it has been found that substantially no draft is permissible, as shown at 36 in Figure 7.

In operation, the dies which correspond to dies 24 and 26 of Figure 4 close in upon the rough forging. The coining portions shape the races more accurately. The shoulder 22 is forced over against the substantially vertical draw surface, and the whole yoke arm in the region of the race is very accurately formed. The amount of metal is further reduced by making the draw face 30 begin at or closer to the edge of the finished race, rather than leave a machining margin such as is necessary in a rough forging.

Figure 7 clearly shows the comparative quantities of metal between the old process and the modified form of the invention. The broken line outline 30 shows the forging outline according to the prior art. The finished forging according to the modified form of the invention is shown by line 36, clearly indicating the substantially vertical draft surface. The finished yoke is indicated by the line 38. It is readily apparent that the amount of metal removed from the machining operation, shown by horizontal cross hatching, is so great as compared to the amount of metal left for machining, shown by vertical cross hatching, that a single fine machine cut alone is necessary to finish the yoke. Further, the amount of the undercut is so small under the modified process, as compared to the old process that the metal fibre substantially follows the surface of the finished race.

These results can be accomplished because of the process described, employing a primary step wherein the shoulders are forged in an open position, and a secondary step in which they are closed. The metal flow of a yoke made by the modified process is substantially like that of the first described process. The undercut is so reduced, and the arc of the undercut so small, that the flow lines substantially follow the line of the finished races.

In both processes, by avoiding the cutting of metal fibres, early fatigue is prevented, and unpredictable distortion upon cooling is prevented. Through the elimination of the rough cutting Operation, machining strains are eliminated with their likelihood of causing distortion.

A third embodiment of the invention consists in rough forging the yoke such as shown in Figure 6, and then subjecting the yoke to a coin pressing operation such as shown in Figure 4 to form the outline 36 of Figure 7. This third embodiment is based on the new and novel discovery that a very accurate machining blank may be obtained by coin pressing wherein very little draft is left on the machining blank so shaped. The die pressing is preferably done when the piece is hot.

The yoke is first rough forged to the shape shown in Figure 6. While still hot, it is subjected to a coin pressing operation much like that shown in Figure 4. The coin press dies may be very accurately formed, and will retain their accuracy for long periods, since the major work of forming the rough forging has been done. Due to this fact a minimum amount of draft is used on the pressing dies. This process results in a machining yoke blank similar to the outline of line 36 in Figure 7.

The advantage of this third embodiment over the other two embodiments of the invention lies in the elimination of the bending of the edges of the yokes. Eliminating this step saves possible cut and try complications in the design and building of dies. The same advantages of the second embodiment of the invention apply largely to this third embodiment because the final outline of the yoke is much the same. Thus, when compared to the old art, rough machining operation may be eliminated, doubling the output of present equipment. The grain flow more nearly follows the surface of the finished race, and distortion upon cooling is largely eliminated.

Although the invention has been described with reference to particular embodiments thereof, it is not limited to such embodiments, nor otherwise except by the terms of the following claims.

I claim:

1. A method of forming a universal joint yoke which comprises forging a blank to form a yoke having a pair of arms, each of said arms being provided with a pair of oppositely directed extensions, said arms being formed with partially completed bearing portions, and thereafter die-pressing all of said extensions inwardly an amount sufficient to complete the formation of said bearing portions, while supporting the remainder of the yoke, said die-pressing operation characterized by the absence of a backing member.

2. The method of forming a universal joint yoke which comprises forging a blank to form a yoke having a pair of arms, each of said arms being formed with oppositely disposed partially completed bearing surfaces, these surfaces including a concave portion and straight portion tangentially disposed to the concave portion, and thereafter die-pressing the arms inwardly so that the tangentially formed portion will conform to the concave portion to complete the bearing surfaces, said die-pressing operation characterized by the absence of a backing member.

3. The method of forming a universal joint yoke which comprises forging a blank into a yoke having a pair of diametrically-opposed substantially Y-shaped arms, each of said arms being provided with oppositely-disposed bearing portions, die-pressing the outer extremities of the Y-shaped arms inwardly against a die section to form a T-shaped section on the arm, and thereafter machining the yoke.

4. In a universal joint yoke forming process, the die-forming steps for obtaining a substantially non-inclined draw face at the races, comprising forging the arms of a yoke Y section, die-pressing the extremities against a die to form a T-shaped section, and thereafter machining the yoke.

5. The method of forming a universal joint yoke which comprises forging a blank to form a yoke having a pair of spaced arms on which there are bearing portions, die-pressing the yoke forging further to form the bearing portions and to make the flow lines of the metal adjacent the bearing portions substantially follow the surface of said bearing portions, machining the yoke, and thereafter carburizing the yoke.

6. The method of forming a universal joint yoke which comprises forging a blank to form a yoke having a pair of spaced arms on which there are bearing portions, die-pressing the yoke forging further to form the bearing portions and to make the flow lines of the metal adjacent the bearing portions substantially follow the surface of said bearing portions, machining the yoke, and thereafter hardening the yoke.

7. The method of forming a universal joint yoke which comprises forging a blank to form a yoke having a pair of arms, each of said arms having a partially completed bearing portion, subjecting the yoke thus formed to a die-pressing operation to further form the bearing portions and to make the flow lines of said forging substantially follow the surface of said bearing portions, machining the yoke, and thereafter carburizing the yoke.

8. The method of forming a universal joint yoke which comprises forging a blank to form a yoke having a pair of arms, each of said arms having a partially completed bearing portion, die-pressing said yoke to further complete the bearing portions and to make the flow lines of said forging substantially follow the surface of said bearing portions, machining said yoke, carburizing said yoke, and thereafter hardening said yoke.

9. The method of forming a universal joint yoke which comprises forging a blank to form a yoke having a pair of arms on which are partially completed bearing portions, die-pressing the yoke to further form the bearing portions and to make the flow lines of said forging substantially follow the surface of said bearing portions, annealing the yoke, machining the yoke, carburizing the yoke, and thereafter hardening the yoke.

EDWARD B. STURGES.

CERTIFICATE OF CORRECTION.

Patent No. 2,304,666. December 8, 1942.

EDWARD B. STURGES.

It is hereby certified that error appears in the printed specification of the above numbered patent requiring correction as follows: Page 3, second column, line 13, claim 4, after the word "yoke" insert --in--; and that the said Letters Patent should be read with this correction therein that the same may conform to the record of the case in the Patent Office.

Signed and sealed this 13th day of April, A. D. 1943.

(Seal)
Henry Van Arsdale,
Acting Commissioner of Patents.